United States Patent
Andrieu et al.

(10) Patent No.: US 7,063,447 B2
(45) Date of Patent: Jun. 20, 2006

(54) ILLUMINATING DEVICE FOR A CIGAR LIGHTER OR MULTI-FUNCTION ELECTRIC SOCKET

(75) Inventors: Michel Andrieu, Bobigny Cedex (FR); Jean-Michel Can, Bobigny Cedex (FR); Francis Lau, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 27 days.

(21) Appl. No.: 10/943,738

(22) Filed: Sep. 17, 2004

(65) Prior Publication Data

US 2005/0099800 A1    May 12, 2005

(30) Foreign Application Priority Data

Sep. 19, 2003   (FR) .................................. 03 11056

(51) Int. Cl.
*F21W 101/00*   (2006.01)
(52) U.S. Cl. ...................................... 362/488; 362/253
(58) Field of Classification Search ................ 362/488, 362/253

See application file for complete search history.

(56) References Cited

U.S. PATENT DOCUMENTS

| 4,213,665 | A |  | 7/1980 | Murray et al. |
| 4,527,048 | A |  | 7/1985 | Comerford et al. |
| 4,899,263 | A |  | 2/1990 | Lupoli et al. |
| 5,928,538 | A |  | 7/1999 | Thivet et al. |
| 5,928,539 | A |  | 7/1999 | Thivet et al. |
| 5,998,763 | A |  | 12/1999 | Mattis et al. |
| 6,740,850 | B1 | * | 5/2004 | Mattis ........................ 219/265 |

FOREIGN PATENT DOCUMENTS

| DE | 0819575 A | 1/1998 |
| DE | 29724118 | 2/2000 |
| EP | 0819575 A | 1/1998 |
| GB | 767444 | 1/1955 |

* cited by examiner

*Primary Examiner*—Laura Tso
(74) *Attorney, Agent, or Firm*—Morgan & Finnegan, LLP

(57) ABSTRACT

The object of the invention is an illumination device for a cigar lighter comprising: an illuminating ring on which an illuminating module is mounted, the said illuminating module comprising: at least one printed circuit provided with at least one light-emitting diode and possibly at least one resistor, a cover intended to at least partly house the said printed circuit, at least two electrical supply tongues for the said printed circuit, mechanically fixed to the said cover.

17 Claims, 4 Drawing Sheets

ILLUMINATING DEVICE FOR A CIGAR LIGHTER OR MULTI-FUNCTION ELECTRIC SOCKET

FIELD OF THE INVENTION

The present invention concerns electrical cigar lighters, or multi-function electric sockets, in particular intended to equip motor vehicles. It relates more particularly to the means for illuminating cigar lighters, in particular in the form of illuminating rings associated with an illuminating module.

BACKGROUND OF THE INVENTION

In a known manner, cigar lighters are illuminated by a lamp mounted in an illuminating module. The electrical supply to this lamp is effected by means of blades made from conductive material. These blades are on the one hand in electrical contact with the body of the cigar lighter forming an earth. They are moreover either in contact with a tongue of the connector or directly connected to the electrical supply cable. One example of an illuminating module carried by an illuminating ring of a cigar lighter is described in the patent FR 2 758 111.

It is sought to improve the reliability and longevity of the lamps. This is the reason why it was proposed in the patent application EP 819 575 to replace the conventional lamp with a light-emitting diode, generally designated by the English term LED. Diodes in fact generally have a longer service life than conventional lamps, and a lower electrical consumption. However, the arrangement of the diode in the cigar lighter according to this document does not entirely give satisfaction: it does not make it possible to illuminate the ashtray, and leakages of light by reflection on the metallic body of the cigar lighter can be feared. Nor does it appear to afford a great deal of flexibility in its electrical supply method. It also makes it necessary to completely revise the design of the illuminating ring which is associated with it, and its mounting is not very compact. It also makes it necessary to use a manual soldering method for the connection wires between the friction contacts and to place the diode, as well as the resistor and the friction contacts, on a slide before soldering them together in order to produce the electrical circuit.

The aim of the invention is therefore to avoid these drawbacks, in particular by improving the design of the illuminating modules for a cigar lighter. The invention seeks in particular to develop illuminating modules using light-emitting diodes and which are reliable and have a long service life but which are also, for example, more compact, easier to mount in an automated manner, or which require as few modifications as possible in the design of the cigar lighter overall and in that of the fixing ring in particular.

SUMMARY OF THE INVENTION

The object of the invention is first of an illuminating device for a cigar lighter comprising: an illuminating ring on which an illuminating module is mounted, the said illuminating module comprising:
  at least one printed circuit provided with at least one light-emitting diode,
  a cover intended to at least partly house the printed circuit,
  at least two electrical supply tongues for the said printed circuit, mechanically fixed to the said cover.

Within the meaning of the invention, printed circuit means the printed circuit or circuits deposited on its substrate and provided with appropriate electronic components. This printed circuit can also be provided with one or more resistors.

The printed circuit can be provided with several light-emitting diodes. Using diodes is advantageous since this type of light source is reliable, has a long service life and is economical in terms of electrical consumption. Choosing to fix the diodes and their associated printed circuits in a part referred to as a cover independent of the illuminating ring itself is industrially advantageous. This is because it becomes unnecessary to modify the design of the existing illuminating rings, it suffices simply to mount on the ring the illuminating module with diode in place of the conventional module. It is then possible to provide a range of illuminating modules with diodes, identical structurally to each other, but equipped with diodes emitting the various colours required: thus there will be a module with a red diode, a module with a blue diode etc.

Advantageously, the or at least one of the diodes is soldered directly to the printed circuit.

By way of example, this soldering can be carried out in an automated manner on a plate made from electrically insulating material covered with a deposition of copper, in which the electrical circuit connecting the components of the circuit is produced by removal of the copper, by mechanical or chemical means. On this circuit there can be located, soldered in series with a diode, a resistor with a value adapted to the supply voltage of the diode. This resistor is then connected electrically to the contact track constituting the + terminal of the circuit. Between each terminal of the circuit there are non-lacquered copper areas for connecting on the one hand the + terminal of the diode to a supply tongue and on the other hand the − terminal of the diode to another supply tongue. The great advantage of this type of design, non-limiting however, is that printed circuits can be produced industrially on their circuits with their associated diodes in an extremely automated fashion, whilst being able to eliminate every manual soldering step. It also allows recourse to printed circuits with diodes of the CMS type, that is to say not traversing, also referred to as surface printed circuits.

Advantageously, the tongues are inserted by sliding in rails formed in the cover of the rebate type, and are in particular locked mechanically on the cover, preferably by snapping on. The supply tongues are advantageously positioned in the cover by means of a system of rails and complementary runners.

This method of assembly is simple and guarantees the correct fixing of the tongue when the latter is mounted, which is a convenience for the operator. In addition, there is thus the possibility of automatically assembling the illuminating module, keeping only one direction of assembly of the various elements which make it up.

Advantageously, the printed circuit is positioned in the cover by means of a system of rails and complementary runners. The most simple design consists of the cover being provided with runners and grooves in which the circuit can be inserted. The cover or the circuit can be provided with specific rails. More simply still, in particular when the circuit has approximately the shape of a parallelepiped, at least at its periphery, it is possible to use two of its opposite edges for serving as rails.

The printed circuit is preferably mechanically locked in the cover, in particular by means of lugs projecting therefrom and producing stops preventing it from emerging from the runner or runners, and complementary cavities present in the cover, of the snapping-on system type. A slight deformation of the circuit advantageously enables the latter to project beyond these stops during assembly.

Still in order to simplify the design of the product, it is preferred for the electrical contact between the supply tongues and the printed circuit to be made by direct contact. Then a spring effect of the tongues is advantageously used, choosing an appropriate form of the tongues having a certain degree of flexibility. They preferably have a folded area so as to exert a mechanical pressure against the surface of the circuit providing the actual electrical contact between the tongues and the circuit. The folded area can be in the form of an elongate U (one of the arms of the U coming to bear on the surface of the circuit), or any other more complex form. The tongues are therefore preferably chosen so as to be made from conductive material, and in the form of flexible blades having a folded area on at least one portion of their length. They can be in the form of a clamp with several arms, one arm of which is fixed to one face of the cover by snapping on or any other mechanical fixing means, the other arm makes contact with the printed circuit by pressure of the spring type.

The cover is preferably mounted on the illuminating ring by a snapping-on system, in particular of the type described in the patent FR 2 758 111. It can be locked mechanically in position by any mechanical means, in particular by the said snapping-on system, by a system of lugs and complementary cavities.

In concrete terms, it is therefore possible to provide a cover, preferably in the form of a housing made from plastics material, for example injected thermoplastic, which is provided with appropriate rebates for integrating a printed circuit and supply tongues.

According to a variant, one of the supply tongues can be provided with at least one reflective area, with adapted shape and properties (by adding a small mirror, localised treatment of the metallic blade etc). This reflective area can be disposed opposite an opening formed in the printed circuit, and in a configuration with respect to the diode emitting the light such that all or part of the light flux is redirected by this area through the opening in a predetermined direction. This flux thus taken can serve, for example, to illuminate the vehicle ashtray, generally in the immediate vicinity of the cigar lighter, without having recourse to a second light source dedicated to this purpose. Naturally the reflective area can also be dissociated from the tongue, and be disposed, for example, on or in the cover.

Another object of the invention is the cigar lighter comprising this illuminating device and the vehicle comprising this cigar lighter.

The invention will be detailed below with non-limiting examples, by means of the following figures:

BRIEF DESCRIPTION OF THE DRAWINGS

FIGS. 4 and 5: two perspective views of the cover of the illuminating device

DESCRIPTION OF THE PREFERRED EMBODIMENTS

The figures are given only by way of indication.

Figure 1:
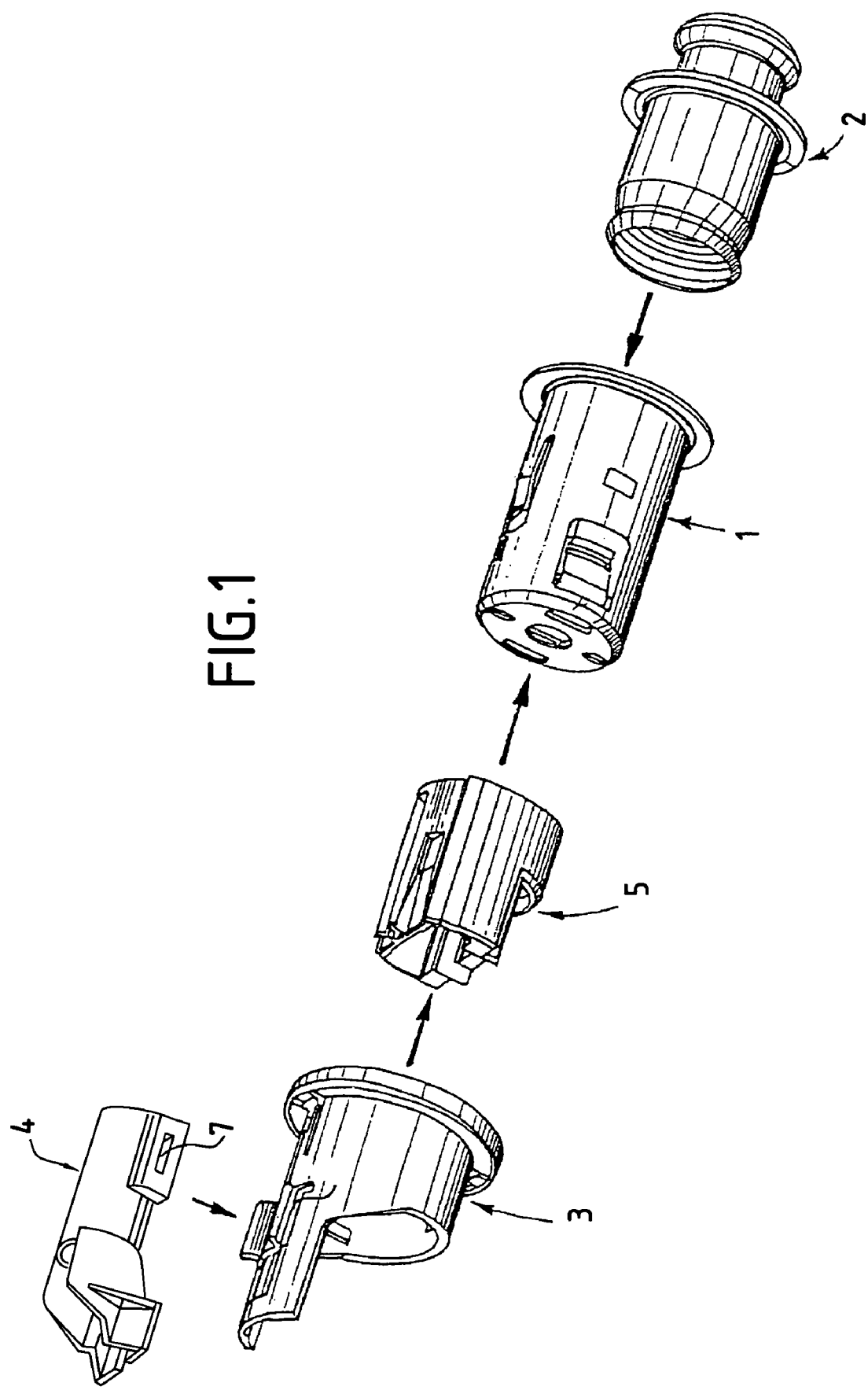
FIG. 1: a view in exploded perspective showing the main subassemblies of a cigar lighter with illuminating ring

FIG. 1 therefore depicts a cigar lighter with an illuminating ring, as described in more detail in the aforementioned patent FR2 758 111. This cigar lighter comprises a lighting body 1 for receiving and heating a removable heated plug 2. It also comprises an illuminating ring 3 made from translucent material intended to surround the lighting body 1 for fixing the said body to the fixed wall of the vehicle and locating the cigar lighter at night, and an illuminating module 4 for illuminating the illuminating ring 3, a connection module 5 for supplying the illuminating body 1. The illuminating module 4, of a conventional type, is mounted on the ring 3 by means of a snapping-on system between cavities presented at the top part of the ring on protuberant elements 6, cavities which will cooperate with lugs 7 present in the front bottom part of the illuminating module 4', with mechanical locking provided at the end of travel when the module is mounted on the ring.

Figure 2:
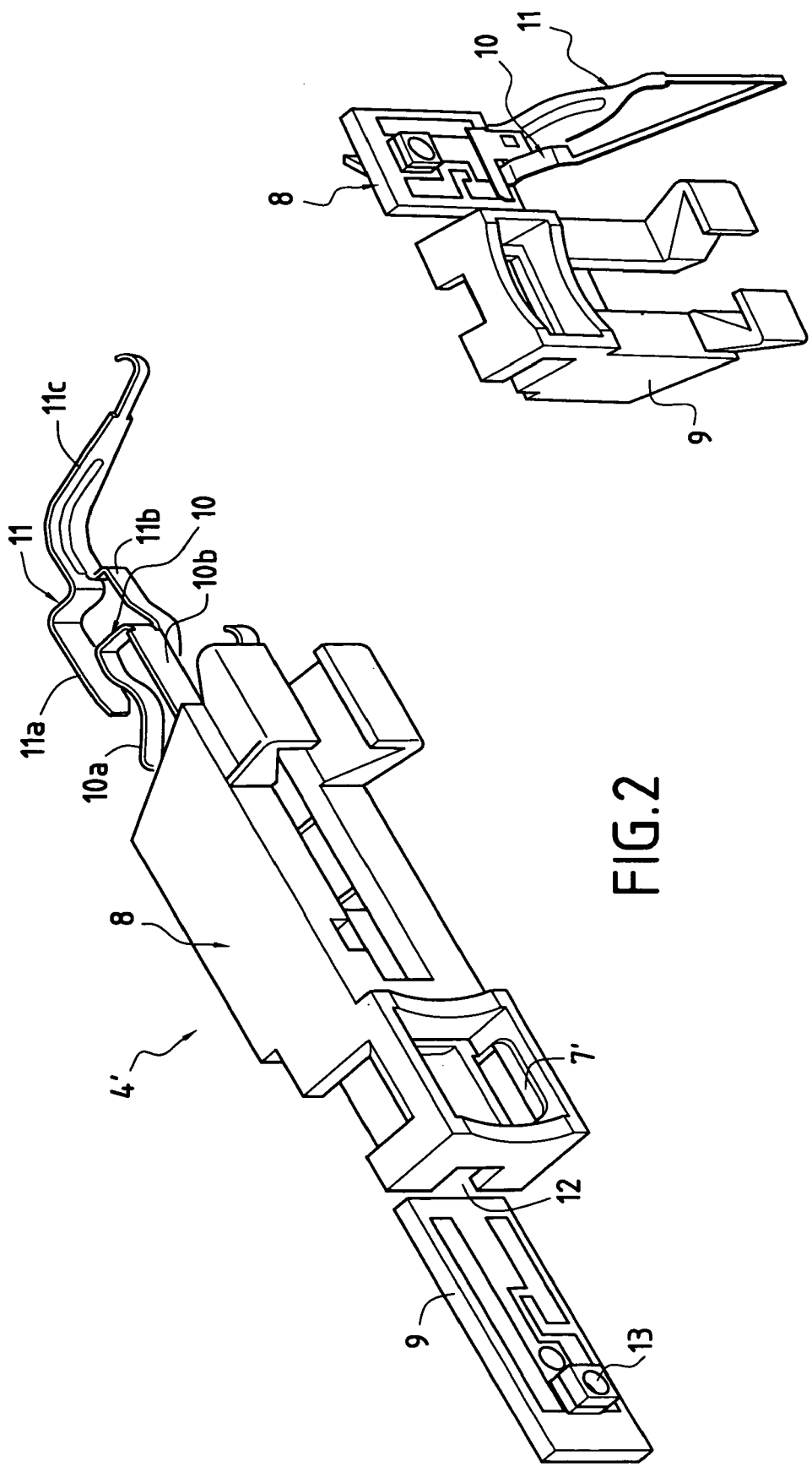
FIG. 2: a view in exploded perspective of the illuminating device according to the invention, before mounting
Figure 3:
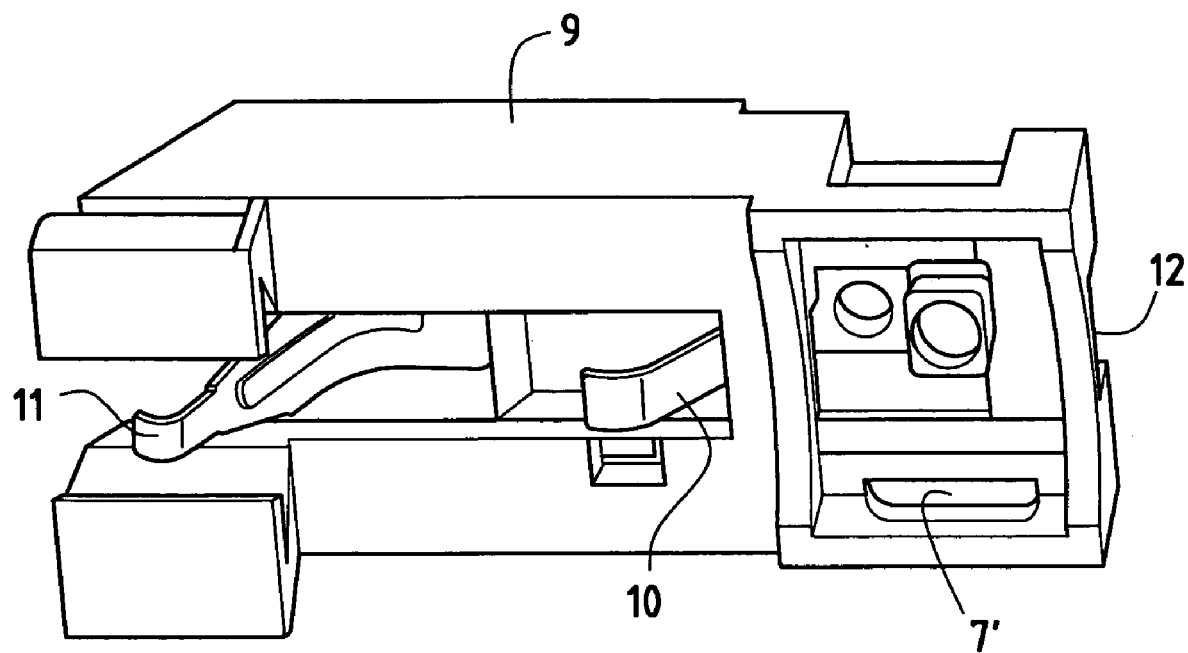
FIG. 3: a representation in view from below of the illuminating device according to FIG. 2 after mounting
Figure 4:
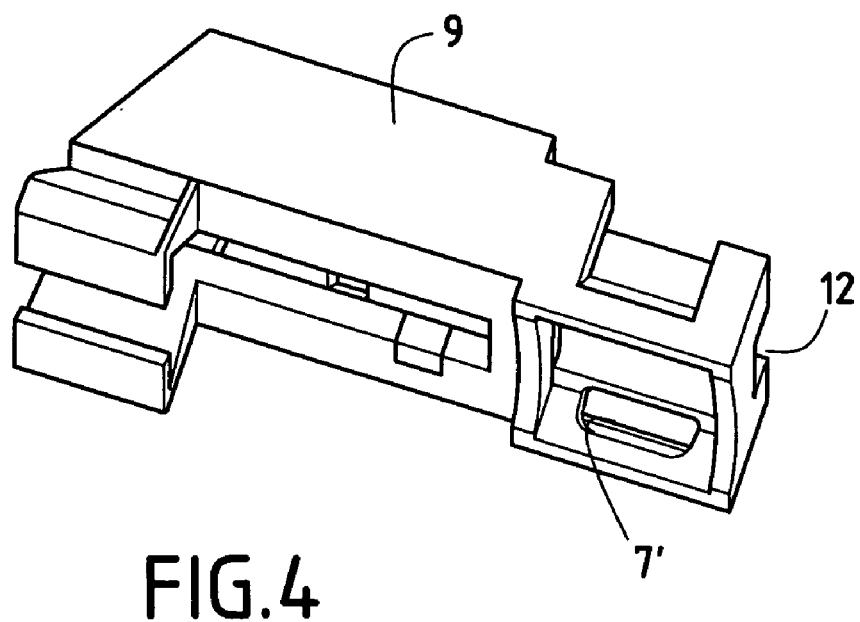
Figure 6:
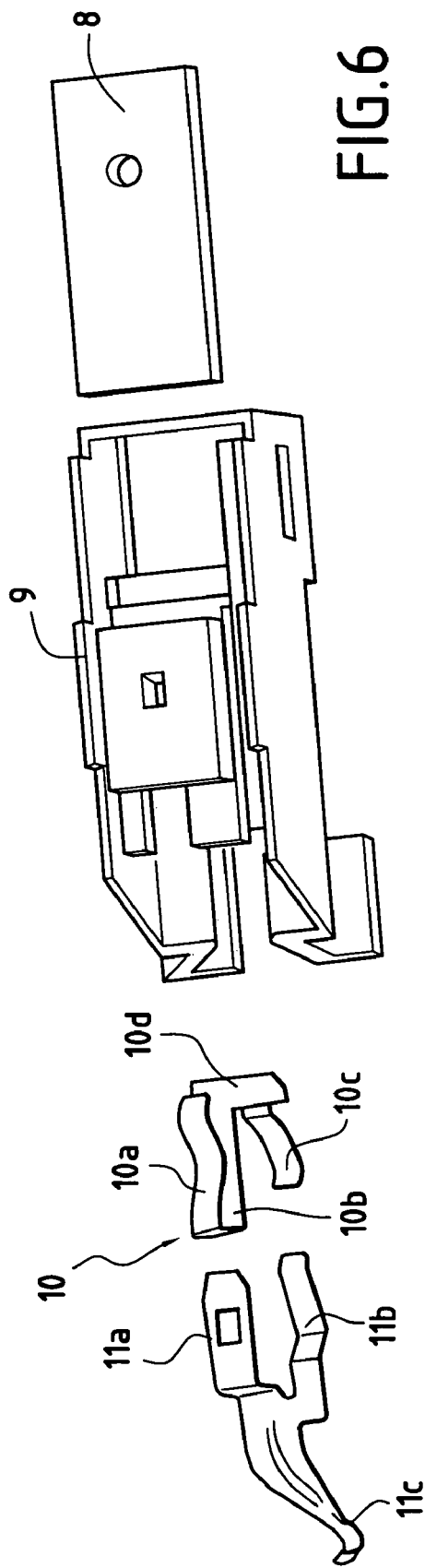
FIGS. 6 and 7: two perspective views of the supply tongues of the illuminating device.

The invention has developed a novel type of illuminating module not requiring any modification to the design of the illuminating rings: FIG. 2 shows the illuminating module 4' according to the invention, able to be fixed to a ring 3. this module comprises the cover 8, having lugs 7' able to cooperate with the cavities 6 in the ring. (These rails and lugs 7' can be seen in more detail in FIGS. 3 to 5.) The illuminating module 4' also comprises a printed circuit 9 on which a light-emitting diode, not shown, is mounted. The circuit 9 is mounted in the cover 8 by means of rails present in the cover, in which a recess 12 has been provided in order in particular to allow the head of the diode to pass. The circuit 9 is fixed in the cover 8 by snapping in. FIGS. 2, 3 and 5 depict the two supply tongues 10, 11 having a folded shape. The tongue 10 has a curved arm 10*a* and a substantially planar arm 10*b*, the two arms being connected to each other by a curved intermediate area, it also has an arm 10*c* connected by an intermediate area 10*d* diametrically opposed to the previous intermediate area, the arm 10*c* constituting the blade in contact with the printed circuit. The tongue 11 is provided with an arm 11*a* provided with a lug for fixing to the cover, an arm 11*b* which constitutes the blade in contact with the printed circuit, the arms 11*a* and 11*b* being extended by a blade 11*c* accessible once the tongue 11 is inserted in the cover. FIGS. 6 and 7 depict these tongues according to two variants: in FIG. 6 the tongue 10 is as described previously, in FIG. 7 the tongue 10 has been modified in order to include an area 10*e* serving as an optical reflector, so as to be able to redirect all or some of the light flux from the diode to the ashtray for example.

The tongues 10 and 11 each have a lug on one of their arms which, when the tongues are mounted by sliding in rails on the cover, are snapped into openings provided in the cover in order to provide their mechanical locking. The tongue 10 is the one providing the electrical contact with earth, the tongue 11 is the one providing contact with a tongue on the connector connected to the + terminal of the light source. As already described, another arm of the tongues makes electrical contact, by spring effect by direct contact, with the appropriate tracks on the printed circuit.

Figure 7:
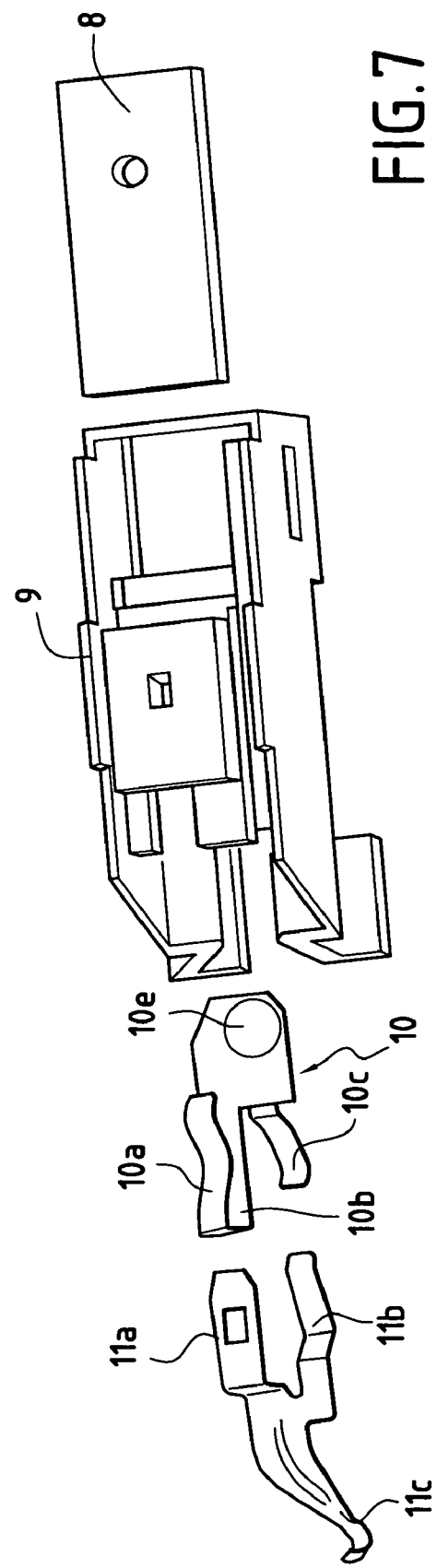

FIG. 2 and FIG. 7 in particular show the printed circuit 9 provided with an area 13 where the diode is mounted and, adjacent, a circular opening. This circular opening cooperates with a modified area 10*e* of the tongue 10, an area treated in order to fulfil the role of a mirror. Part of the light flux of the diode, half in particular, can thus be sampled and redirected by the mirror in a direction opposite to the main direction of emission, this redirected flux then illuminating the ashtray. This variant is optional. In FIG. 2 it is also possible to see electrical connection tracks on the circuit 9.

FIG. 2 also explains the way in which the illuminating module is mounted, with a mounting of the printed circuit in the cover by sliding of the circuit at one of the ends of the said cover, and mounting of the two tongues by insertion of these through the opposite end of the cover, the tongue 11 coming to cover the tongue 10 at the time of mounting. FIG. 3 shows the complete illuminating module.

There is therefore a cover adaptable to any standard illuminating ring, there is no connection wire, and the illuminating module overall 4' is particularly compact and flat. It is possible, in an automated fashion, to assemble the components of the printed circuit and then mount the finished printed circuit and its connection tongues in the cover, which gives facilitated industrial manufacture.

The invention can be adapted so as to be applied to multi-function sockets in vehicles.

What is claimed:

1. Illuminating device for a cigar lighter comprising:
   an illuminating ring on which an illuminating module is mounted, wherein the said illuminating module comprises at least one printed circuit provided with at least one light-emitting diode and at least one resistor, a cover intended to at least partly house the said circuit and its printed circuit, at least two electrical supply tongues for the said printed circuit, mechanically fixed to the said cover.

2. Device according to claim 1, wherein the or at least one of the light-emitting diodes is soldered directly to the printed circuit.

3. Device according to claim 1, wherein the printed circuit is of the non-traversing type, referred to as CMS.

4. Device according to claim 1, wherein the supply tongues are positioned in the cover by a system of rails and complementary runners.

5. Device according to claim 1, wherein the supply tongues are locked on the cover by a snapping-on system.

6. Device according to claim 1, wherein the printed circuit is positioned in the cover by a system of rails and complementary runners.

7. Device according to claim 1, wherein the printed circuit is mechanically locked in the cover by means of a system of lugs and complementary cavities, of the fixing by snapping-on type.

8. Device according to claim 1, wherein the electrical contact between the supply tongues and the printed circuit is achieved by direct contact on areas of the printed circuit, in particular by spring effect of the tongues, for example by means of a folded area of these against the surface of the circuit.

9. Device according to claim 1, wherein the cover is mounted and locked mechanically on the illuminating ring, by means of a system including at least one complementary lug and cavity or cavities of the fixing by snapping-on type.

10. Device according to claim 1, wherein the supply tongues and the circuit are integrated in the cover by rebates formed in the said cover.

11. Device according to claim 1, wherein one of the supply tongues at least is provided with a reflective area.

12. Device according to claim 11, wherein the reflective area is opposite an opening formed in the printed circuit.

13. Device according to claim 11, wherein the reflective area of the supply tongue is opposite the diode and makes it possible in particular to illuminate the vehicle ashtray.

14. Cigar lighter, in particular intended to equip vehicles, which comprises a device according to claim 13.

15. Motor vehicle, wherein it is provided with the cigar lighter according to claim 14.

16. Device according to claim 1, wherein the supply tongues or the circuit are integrated in the cover by rebates formed in the said cover.

17. Illuminating device for a multi function socket comprising: an illuminating ring on which an illuminating module is mounted, wherein the said illuminating module comprises at least one printed circuit provided with at least one light-emitting diode and at least one resistor, a cover intended to at least partly house the said circuit and its printed circuit, at least two electrical supply tongues for the said printed circuit, mechanically fixed to the said cover.

* * * * *